W. H. SMITH.

Vapor-Burner.

No. 8,437. Reissued Sept. 24, 1878.

*Witnesses:*

T. C. Brecht.

L. H. Guisabaugh

*Inventor:*

Willard H. Smith, by Wm. G. Henderson

*Attorny.*

N. PETERS, PHOTO-LITHOGRAPHER, WASHINGTON, D. C.

UNITED STATES PATENT OFFICE.

WILLARD H. SMITH, OF NEW YORK, N. Y.

IMPROVEMENT IN VAPOR-BURNERS.

Specification forming part of Letters Patent No. 79,404, dated June 30, 1868; Reissue No. 3,607, dated August 17, 1869; Reissue No. 8,437, dated September 24, 1878; application filed May 28, 1878.

*To all whom it may concern:*

Be it known that I, WILLARD H. SMITH, of the city and county of New York, in the State of New York, have invented certain new and useful Improvements in Light-Oil-Vapor Burners; and I do hereby declare that the following is a full, clear, and exact description of the same, reference being had to the accompanying drawings, making part of this specification, in which—

Figure 1:
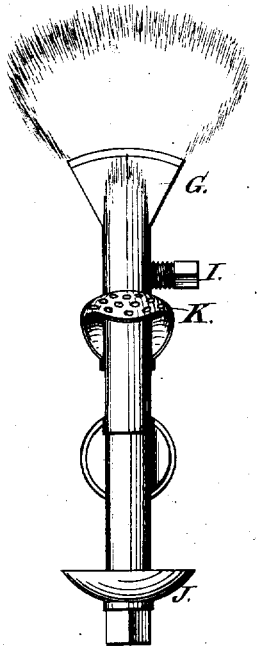
Figure 2:
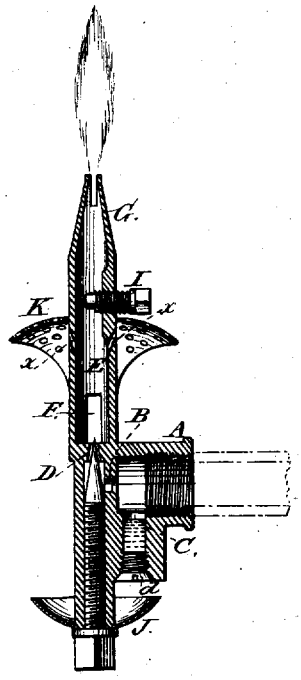
Figure 4:
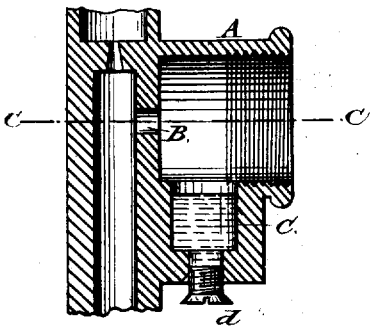
Figure 3:
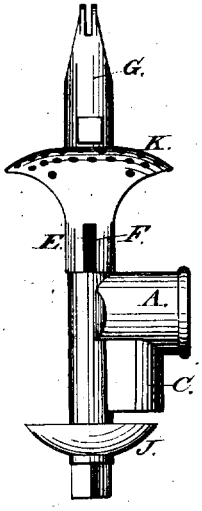
Figure 5:
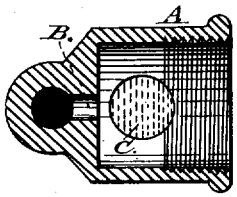

Figure 1 represents a side elevation of the improved burner; Fig. 2, a vertical section of the same; Fig. 3, another side elevation. Fig. 4 is a vertical longitudinal section through the tube, receptacle, and valve-chamber; and Fig. 5 is a horizontal section through the line *c c* of Fig. 4.

Like letters of reference indicate corresponding parts in the several figures.

My invention consists, first, in providing a receptacle below the oil-passage and in communication therewith, whereby impurities or solid matter in the oil will be arrested and prevented from passing into the burner and clogging its passages; secondly, my said invention consists in providing the burner with a perforated heater, in the form of a perforated flange or flanges projecting above one or more gas-passages on its air-tube, whereby the burner is heated more effectively and a more perfect evaporation of the oil and a more rapid draft of air are caused, and consequently a better light is obtained, and the light is made more uniform and steady, while the perforations also provide for automatically relighting the gas-jets; thirdly, my said invention consists in bringing the sides of the perforated heater aforesaid downwardly upon the tube outside of said gas-jets, so as to house or protect the said jets and to extend their heating-sur face.

To enable others skilled in the art to make and use my improved vapor-burner, I will proceed to describe its construction and operation.

A represents the ordinary tube of the burner, to which the feed-pipe is attached. B is the opening through which the vapors of the oil escape into the burner. Now, behind the opening B is arranged a receptacle, C, so that the impurities and solid matters will drop into the receptacle C and be there detained. *d* is a plug or screw, used to close the opening through which the impurities that settle in the receptacle C may be removed.

From the opening B the vapors pass through the usual valve D into the air-tube E, which is provided with the ordinary air-passages F F, through which the air is furnished, and then mixed with the vapors of the oil, producing the inflammable gas, which passes on to the usual flattened and contracted top end, G, of the burner and air-tube.

I represents the air-regulating screw in the air-tube, and J is the usual cup for receiving alcohol or light oil for the first heating of the burner to set it in operation.

Now, in order to produce a better light, more especially in cold weather, and to have a burner capable of giving more heat than those now in use, perforated heaters are employed on the air-tube E. By having fine passages *x x* above the air-passages F F, through which small jets of gas issue, and by providing perforated flanges K K above said passages, the heat from these gas-jets is conducted downward upon the lower part of the burner and upon the oil as it enters the burner, whereby the evaporation of the oil and supply of air are much encouraged and a better flame and light produced thereby.

The flanges K K are perforated, which allows the gas from the jets *x x* to burn both on the outside and inside of the flanges K K, thereby creating a greater amount of heat than the ordinary heaters. The sides of these flanges K K are bent downwardly upon the tube A, leaving the sides of these flanges open, as shown in Fig. 1. By this arrangement the gas-jets issuing through the passages *x x* are, so to speak, housed, and should they be accidentally extinguished the draft created by the perforations of the flanges K K will bring the vapor of the jets upward to the flame of the burner, so as to relight the jets through the perforations, thereby preventing the burner from cooling off and letting the fluid run out when left without attendance.

As the sides of the flanges K K are brought down to the tube A, a larger heating-surface is also obtained.

I do not claim the passages *x x* in themselves considered.

I am aware that a sediment-receptacle located immediately below the vapor-passage is old; but in such case the communication of said receptacle with the vapor-passage is direct, and the sediment is more exposed to the disturbing power of the vapor, while my construction provides a receptacle more directly connected with the oil-passage, and the walls of which extend below and at right angles to the direction of the flow both of the oil and vapor.

What I claim is—

1. In a vapor-burner, a receptacle for sediment located immediately below the oil-supply tube and back of and below the gas-passage, said receptacle having direct communication with the oil-tube and indirect communication with the gas-passage, the whole constructed substantially as shown, so that the sediment may not be liable to be moved by the flow of either the oil or gas.

2. The air-tube E, provided between the air-passages F F and the base of the flame with perforated heaters, consisting of the passages *x x* and a perforated heat-conducting flange or flanges, K K, substantially as and for the purpose herein stated.

3. The perforated heater K, having the sides thereof brought downwardly upon the tube A, substantially as and the purposes set forth.

W. H. SMITH.

Witnesses:
C. A. PEASE,
JAS. L. EWIN.